United States Patent [19]

Kumagai et al.

[11] Patent Number: 4,610,462
[45] Date of Patent: Sep. 9, 1986

[54] ELECTRONICALLY CONTROLLED SUSPENSION SYSTEM

[75] Inventors: Naotake Kumagai, Aichi; Minoru Tatemoto, Okazaki, both of Japan

[73] Assignee: Mitsubishi Jidosha Kogyo Kabushiki Kaisha, Tokyo, Japan

[21] Appl. No.: 636,144

[22] Filed: Jul. 31, 1984

[30] Foreign Application Priority Data

Aug. 19, 1983 [JP] Japan .......................... 58-127284[U]

[51] Int. Cl.$^4$ ............................................. B60G 11/26
[52] U.S. Cl. ............................... 280/707; 280/DIG. 1
[58] Field of Search ......... 280/703, 707, 714, DIG. 1; 267/64.16, 64.25; 188/319, 299, 285; 180/41

[56] References Cited

U.S. PATENT DOCUMENTS

| | | | |
|---|---|---|---|
| 3,575,442 | 4/1971 | Elliott et al. | 280/707 |
| 4,162,083 | 7/1979 | Zabler et al. | 280/703 |
| 4,391,452 | 7/1983 | Ohmori | 280/707 |
| 4,401,310 | 8/1983 | Ishikawa et al. | 280/707 |

FOREIGN PATENT DOCUMENTS

| | | | |
|---|---|---|---|
| 110520 | 7/1982 | Japan | 280/707 |
| 49503 | 3/1983 | Japan | 280/707 |

Primary Examiner—John J. Love
Assistant Examiner—Ross Weaver
Attorney, Agent, or Firm—Robert E. Burns; Emmanuel J. Lobato; Bruce L. Adams

[57] ABSTRACT

An electronically-controlled, car-height adjustable suspension system of a car comprises an engine startup sensor which senses that the engine of the car has just been started, a mean car height computing section that determines the mean value of car height detected by a car height sensor, and a computing time reducing section that reduces the computing time of the mean car height computing section upon receiving a startup signal from the startup sensor, all working in conjunction for the rapid accomplishment of car height adjustment immediately after the startup of the engine. The suspension system assures a quick car height adjustment after the engine startup than usual and, therefore, a comfortable ride.

6 Claims, 2 Drawing Figures

ELECTRONICALLY CONTROLLED SUSPENSION SYSTEM

BACKGROUND OF THE INVENTION

1. Field of the Invention

This invention relates to an electronically controlled suspension system that is adapted to adjust car height more quickly after the engine of a car has been started than while the car is in an ordinary stationary condition by shortening the time during which the mean value of car height is calculated only once after the engine key switch controlling the startup of the engine has been turned on.

2. Description of the Prior Art

Various types of electronically controlled suspension systems have been developed that permit adjusting the car height to provide comfortable ride and stable driving. This type of suspension system generally decides within a given time when to start the car height adjustment, computing the mean car height to be compared with a reference car height. Setting is made to give a longer time (such as 30 seconds) for said given time, herein referred to as a "car height judgement time", while the car is running in order that the car height should not be adjusted every time the car runs on road surface irregularities or every time the car position changes temporarily as a result of acceleration and deceleration. A shorter "car height judgement time" is given when the car is stationary so that changes in car height induced by the riding or alighting of a person or persons are made up for rapidly. Namely, the "car height judgement time" is shorter when the car is stationary than while it is running. But if the "car height judgement time" is cut too short, short car height adjustment may begin while a person or persons are riding or alighting, thereby giving an uncomfortable feeling or sensation to such person. The preferable time should therefore be long enough to allow the driver and all of the passengers to fully get in or out of the car (such as 6 seconds).

When the driver and passengers, if any, have gotten into the car, the car height adjustment should preferably begin as soon as possible. With the conventional electronically controlled suspension systems, however, car height adjustment does not begin until the given "car height judgement time" (such as 6 seconds), though the duration is shorter than the "car height judgement time" allowed while the car is travelling, has passed even if the engine key switch is turned on.

SUMMARY OF THE INVENTION

The object of this invention is to provide an electronically controlled suspension system that permits accomplishing car height adjustment quickly by making the "car height judgement time" shorter than the ordinary duration allowed for the stationary car only once after the driver and passengers, if any, have gotten into the car and the engine key switch has been turned on.

Accordingly, the electronically controlled suspension system according to this invention assumes a comfortable ride because of the advantage that car height adjustment following engine startup is done more quickly than while the car is stationary under ordinary condition.

DETAILED DESCRIPTION OF THE PREFERRED EMBODIMENT

Referring now to the accompanying drawings, an electronically controlled suspension system, which is a preferred embodiment of this invention, will be described hereinafter.

Figure 1:
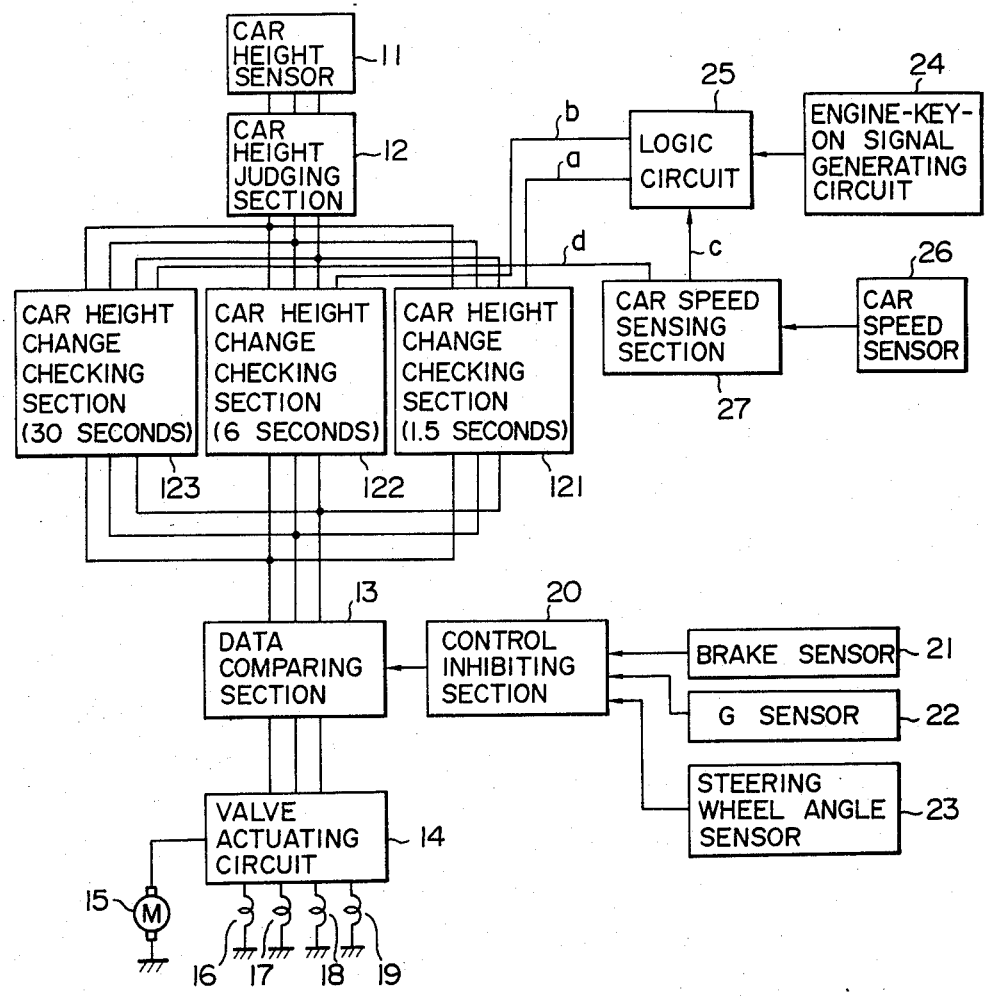
FIG. 1 is a block diagram showing an electronically controlled suspension system embodying the principles of this invention.

In FIG. 1, reference numeral 11 designates a car height sensor that consists of a Hall IC device and a magnet, with one of them attached to the wheel and the other to the car body, and senses the distance from the normal, low or high car height level. A 3-bit car height signal outputted by the car height sensor 11 is inputted to a car height judging section 12 where it is judged based on whether the car height is normal, low or high. A 3-bit car height signal outputted from the car height judging section 12 is inputted into a group of actuatable mean vehicle height computing units comprised of a car height change checking section 121 serving as a third mean car height calculator that calculates the mean value of the car height changing over a period of 1.5 seconds (computing time), a car height change checking section 122 serving as a second mean car height calculator that calculates the mean value of the car height changing over a period of 6 seconds (computing time), and a car height change checking section 123 serving as a first mean car height calculator that calculates the mean value of the car height changing over a period of 30 seconds (computing time).

The car height change checking section 121 checks a change in car height only once immediately after the engine of a stationary car is started, with the car height change sections 122 and 123 performing similar checks while the car is stationary and travelling, respectively. A 3-bit output signal from the car height change checking sections 121 to 123 is inputted into a data comparing section 13 where the input data is compared to the previous data. A valve actuating circuit 14 works according to the deviation (including 0) between the two data.

Here, reference numeral 15 denotes a compressor, 16 a rear solenoid valve, 17 a front solenoid valve, 18 an exhaust solenoid valve, and 19 a suction solenoid valve. A valve actuating circuit 14 opens and closes the solenoid valves 16 to 19 according to road conditions to achieve car height adjustment. As well known in the art, the components 14–19 function as a vehicle height control section for regulating the supply and discharge of fluid to and from a fluid chamber of a suspension unit (not shown) for controlling the height of the vehicle.

Reference numeral 20 designates a control inhibiting section that inhibits the adjustment of car height. Receiving a detection signal from a brake sensor (car condition detecting sensor) 21 that senses if or how far the brake pedal is depressed, a G sensor (car condition detecting sensor) 22 that senses acceleration, and steering wheel angle sensor (car condition detecting sensor) 23 that senses the rotating angle of the steering wheel, the control inhibiting section 20 outputs an operation inhibiting signal to the data comparing section 13 when the detection signal calls for safety consideration.

The operation inhibiting signal is outputted on such occasions, for example, as when the brake sensor 21 senses that the brake pedal is depressed beyond a given limit, the G sensor 22 senses that the car speed is accelerated beyond a given limit, or the steering wheel angle sensor 23 senses that the steering wheel is turned beyond a given limit.

When the operation inhibiting signal is inputted, the data comparing section 13 outputs a car height adjustment inhibiting signal, in preference to a car height adjustment signal, to forcibly inhibit or interrupt the execution of the car height adjustment.

Reference numeral 24 indicates an engine-key-on signal generating circuit that outputs a one-shot pulse when the engine key switch that controls the startup of the engine is turned on. The output signal from the engine-key-on signal generating circuit 24 is inputted into a logic circuit 25 having a startup sensing section and a computing time reduction control section.

Output signals a and b from the logic circuit 25 are inputted into the car height change checking sections 121 and 122, respectively.

Reference numeral 26 designates a car speed sensor, a signal from which is sent to a car speed sensing section 27 for determining whether the car is travelling or stationary. The car speed sensing section outputs a stop signal c that goes low when the car is stationary to the logic circuit 25 and a running signal d that goes high while the car is running to the car height change checking section 123.

Figure 2:
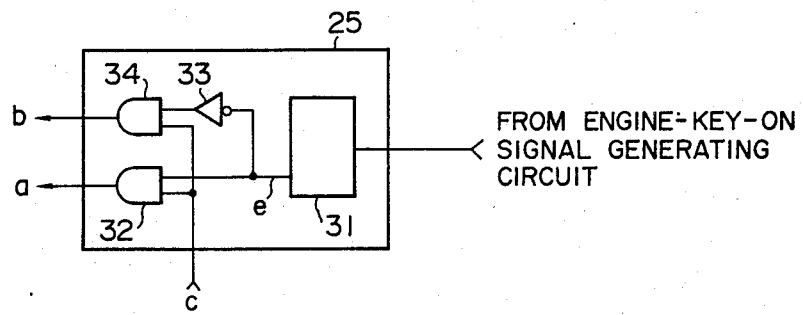
FIG. 2 is a detailed circuit diagram of a logic circuit in the suspension system shown in FIG. 1.

Referring now to FIG. 2, the structure of the logic circuit 25 in FIG. 1 will be described in more detail.

The output signal from the engine-key-on signal generating circuit 24 is inputted into a 1.5-second timer circuit 31. When the one-shot pulse from the enginekey-on signal generating circuit 24 is inputted, the output signal (startup sensing signal) e of the timer circuit 31 goes high for a period of 1.5 seconds. The signal e is inputted into one of the input terminals of an AND circuit 32 and also into one of the input terminals of an AND circuit 34 by way of an inverter 33.

To the other input terminals of the AND circuits 32 and 34 are inputted the stop signal c. When the engine key switch of a stationary car is turned on, the signal a goes high for a period of 1.5 seconds, and then the signal b goes high thereafter as long as the car remains stationary.

The following paragraphs describe the operation of the system that is constructed as described above. On turning on the engine key switch for starting, the engine-key-on signal generating circuit 24 outputs a one-shot pulse to the logic circuit 25. As a consequence, the signal a goes high for a period of 1.5 seconds after turning on the engine key switch as described previously with reference to FIG. 2. As the signal a is inputted into the car height change checking section 121, the car height change checking section 121 checks changes in the car height for the same period of 1.5 seconds.

Accordingly, a 3-bit signal from the car height sensor 11 is inputted into the car height judging section 12 for judging whether the car height is normal, low or high.

Then, a 3-bit signal from the car height judging section 12 is inputted to the car height change checking section 121 for determining the mean value of the car height changing over the period of 1.5 seconds following the turning on of the engine key switch. A 3-bit output signal from the car height change checking section 121 is inputted in the data comparing section 13, in which the input data is compared with the previous data. The valve actuating circuit 14 operates according to the deviation between the compared data. Namely, the valve actuating circuit 14 turns on and off the solenoid valves 16 to 19 to achieve the desired car height adjustment.

This means that the mean car height computing time is reduced to 1.5 seconds following the turning on of the engine key switch. Therefore, the car height that has been lowered by a riding person is rapidly returned to the desired level since car height adjustment begins immediately (1.5 seconds) after the engine key switch is turned on.

Because the signal b goes high after the initial period of 1.5 seconds has passed, car height change is then checked by the car height change checking section 122 (computing the mean car height over a period of 6 seconds).

Thus, in the case where the passengers get out of a car which is now stopped, or plural passengers get into a car with the engine key switch thereof already turned on, the car height judging time is now set at 6 seconds which is generally considered necessary for all the passengers to get in or out of a car. This remarkably reduces the undesirable possiblity that car height adjustment begins while passengers are still getting into or out of a stopped car.

While a car is running, the signal d goes high and, therefore, car height change is checked by the car height change checking section 123 (computing the mean car height over a period of 30 seconds). This prevents car height adjustment from being made every time a car travels on road surface irregularities or every time car position changes temporarily as a result of acceleration and deceleration during running.

What is claimed is:

1. An electronically controlled suspension system comprising: a suspension unit interposed between a wheel and vehicle body of a vehicle and having a vehicle height adjusting fluid chamber, a vehicle height sensor, a vehicle height control section for regulating the supply and discharge of fluid to and from said fluid chamber according to a signal from said vehicle height sensor, a mean vehicle height computing section for calculating the mean value of vehicle height changing over a predetermined mean vehicle height computing time based on the detection signal from said vehicle height sensor, a startup sensing section for outputting a startup detection signal of a given time length from the moment an engine key switch is turned on, a group of actuatable mean vehicle height computing units comprised of a first mean vehicle height computing unit having a first longer computing time suited for computing the mean vehicle height of a travelling vehicle, a second mean vehicle height computing unit having a second computing time shorter than said first computing time and suited for computing the mean vehicle height of a stationary vehicle, and a third mean vehicle height computing unit having a third computing time shorter than said second computing time and suited for beginning vehicle height adjustment sooner than the usual vehicle height adjustment of the stationary vehicle, a vehicle speed sensor, a travel sensing section for outputting a signal indicative of whether the vehicle is travelling or stationary based on a detection signal from said vehicle speed sensor and operative to actuate only said first mean vehicle height computing unit among said group of mean vehicle computing units when it is sensed from the detection signal from said vehicle speed sensor that the vehicle is travelling, and a computing time reducing section operative to actuate only said third mean vehicle height computing unit among said group of mean vehicle computing units only once after receiving said startup detection signal from said startup sensing section when the signal from said vehicle speed sensor indicates that the vehicle is stationary, and operative to actuate only said second mean vehicle height computing unit among said group of mean vehicle computing units after vehicle height adjustment based on the output from said third mean vehicle height computing unit has been accomplished when the signal from said vehicle speed sensor indicates that the vehicle is stationary.

2. An electronically controlled suspension system according to claim 1, in which said reduced mean vehicle height computing time for the mean vehicle height computing section is not longer than said time length of the startup detection signal from the startup sensing section.

3. An electronically controlled suspension system according to claim 1, which further comprises a vehicle condition sensor, and a control inhibiting section operative to inhibit the vehicle height controlling section from controlling vehicle height according to the detection signal from said vehicle condition sensor.

4. An electronically controlled suspension system according to claim 3, in which said vehicle condition sensor comprises a brake sensor that senses the braking power applied to the vehicle.

5. An electronically controlled suspension system according to claim 3, in which said vehicle condition sensor comprises an acceleration sensor that senses the rate at which the car is accelerated.

6. An electronically controlled suspension system according to claim 3, in which said vehicle condition sensor comprises a steering wheel angle sensor that senses the angle at which the steering wheel of the vehicle is turned.

* * * * *